United States Patent
Neuhoff

(10) Patent No.: US 10,744,977 B2
(45) Date of Patent: Aug. 18, 2020

(54) METHOD FOR CONTROLLING ACCESS TO A MOTOR VEHICLE

(71) Applicant: HUF HÜLSBECK & FÜRST GMBH & CO. KG, Velbert (DE)

(72) Inventor: Stefan Neuhoff, Essen (DE)

(73) Assignee: Huf Huelsbeck & Fuerst GmbH & Co. KG, Velbert (DE)

( * ) Notice: Subject to any disclaimer, the term of this patent is extended or adjusted under 35 U.S.C. 154(b) by 0 days.

(21) Appl. No.: 16/310,220

(22) PCT Filed: May 16, 2017

(86) PCT No.: PCT/EP2017/061754
§ 371 (c)(1),
(2) Date: Dec. 14, 2018

(87) PCT Pub. No.: WO2017/220260
PCT Pub. Date: Dec. 28, 2017

(65) Prior Publication Data
US 2019/0143942 A1 May 16, 2019

(30) Foreign Application Priority Data

Jun. 20, 2016 (DE) .................. 10 2016 111 276

(51) Int. Cl.
*B60R 25/24* (2013.01)
*G07C 9/00* (2020.01)
*H04B 7/06* (2006.01)

(52) U.S. Cl.
CPC ........ *B60R 25/245* (2013.01); *G07C 9/00309* (2013.01); *H04B 7/06* (2013.01);
(Continued)

(58) Field of Classification Search
CPC .............. B60R 25/245; G07C 9/00309; G07C 2009/00555; G07C 2009/00793; G07C 2009/63; H04B 7/06
(Continued)

(56) References Cited

U.S. PATENT DOCUMENTS

2006/0255909 A1* 11/2006 Pavatich ................. B60R 25/24
340/5.64
2013/0063247 A1* 3/2013 Blatz ................. G07C 9/00309
340/5.72
(Continued)

FOREIGN PATENT DOCUMENTS

DE      100 32 936 A1      2/2002
DE      102006008140    *  2/2006 ............. G07C 11/00
(Continued)

OTHER PUBLICATIONS

International Preliminary Report on Patentability of International Application No. PCT/EP2017/061754 dated Dec. 25, 2018, 12 pages (and English Translation).
(Continued)

*Primary Examiner* — Steven Lim
*Assistant Examiner* — Mancil Littlejohn, Jr.
(74) *Attorney, Agent, or Firm* — Fay Sharpe LLP

(57) ABSTRACT

A method for operating a passive access system for motor vehicles includes arranging multiple transmission antennas at different locations on a motor vehicle for sending out low frequency signals. A mobile ID transponder, formed by a 3D-receiving antenna assembly, receives the low frequency signals. The antennas send out time-delayed first signals and then simultaneously send out signals. A signal strength is detected by the 3D antenna assembly in the ID transponder for each spatial direction. Information related to the space-direction-dependent signal strengths is transmitted from the
(Continued)

ID transponder to the motor vehicle. Depending on the received information, the transmission signal strengths are adjusted. Then, further low frequency signals are sent, and received in the ID transponder. Based on further signal strength information, a plausibility check is performed in order to detect an extension of the signal path between the motor vehicle and the ID transponder via intermediate stations.

21 Claims, 5 Drawing Sheets

(52) U.S. Cl.
CPC ........... *G07C 2009/00555* (2013.01); *G07C 2009/00793* (2013.01); *G07C 2209/63* (2013.01)

(58) Field of Classification Search
USPC ........................................ 340/5.72
See application file for complete search history.

(56) References Cited

U.S. PATENT DOCUMENTS

| 2016/0148448 | A1* | 5/2016 | Blatz | B60R 25/24 |
| | | | | 340/5.61 |
| 2016/0275734 | A1* | 9/2016 | Blatz | B60R 25/24 |
| 2017/0320465 | A1* | 11/2017 | Lin | G07C 9/00182 |

FOREIGN PATENT DOCUMENTS

| DE | 10 2005 013 910 B3 | 9/2006 |
| DE | 10 2005 039 562 A1 | 3/2007 |
| DE | 10 2006 008 140 A1 | 8/2007 |
| EP | 0 980 800 A2 | 2/2000 |
| WO | WO 2015/084852 A1 | 6/2015 |

OTHER PUBLICATIONS

International Search Report of International Application No. PCT/EP2017/061754 dated Aug. 30, 2017, 6 pages.

\* cited by examiner

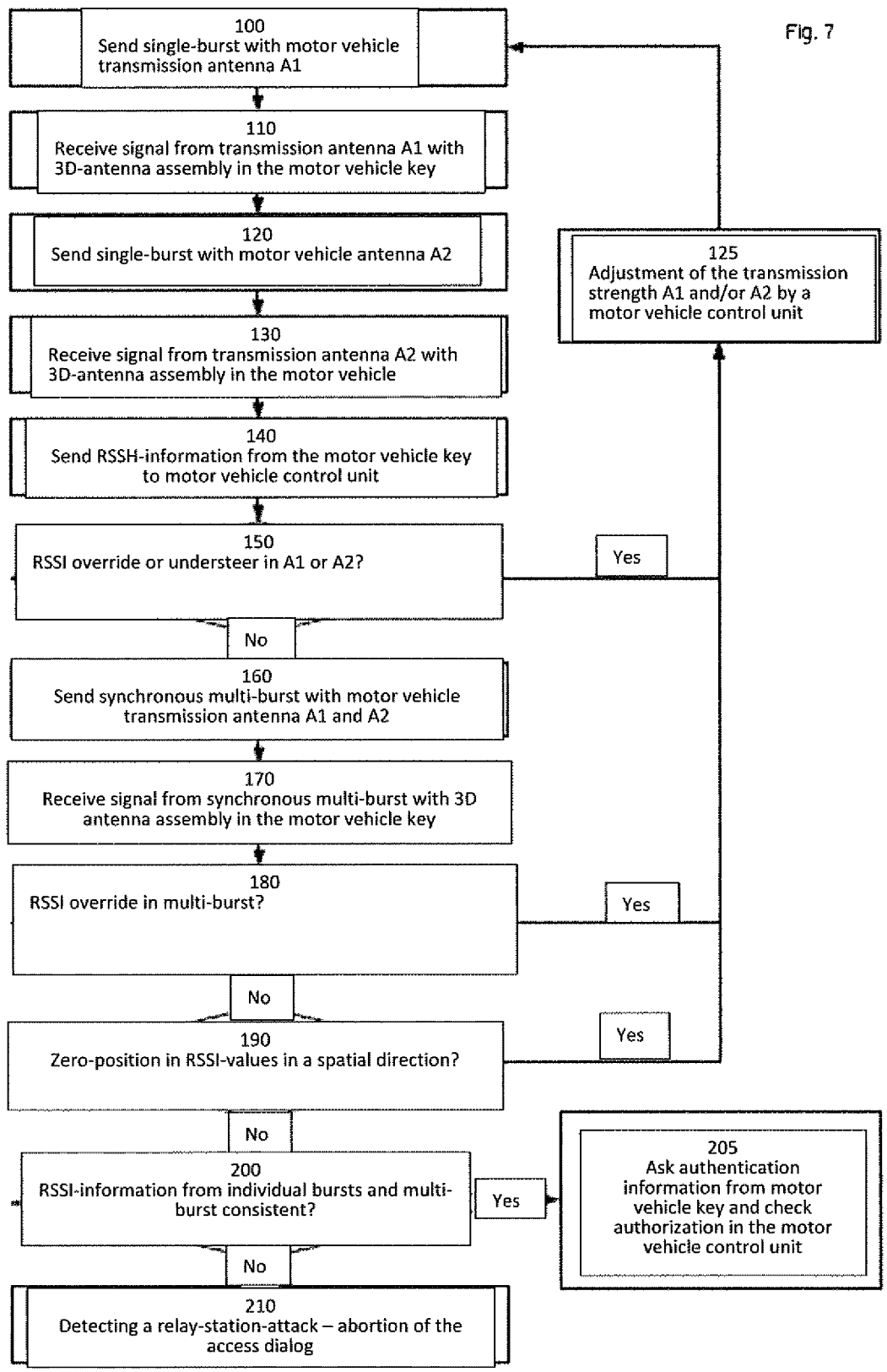

METHOD FOR CONTROLLING ACCESS TO A MOTOR VEHICLE

BACKGROUND

The invention relates to a method for controlling access to a motor vehicle. In particular, the invention relates to a method for checking the legitimacy of access, in which a keyless access system (keyless entry) is used.

Keyless access systems allow legitimate users of a motor vehicle to initiate a legitimacy check in the motor vehicle without mechanical action on the motor vehicle and merely by the approach of wireless communication means to the motor vehicle. The user carries an ID transponder (e.g., a radio vehicle key) having a control unit integrated therein. The ID transponder-side control unit is coupled to a transmission-reception means. On the vehicle side, a vehicle-side control device having an associated transmission-reception means is present.

An ID transponder and a motor vehicle exchange information between the respective control units.

Signals are often transmitted both in the low frequency range (a few to several hundred KHz) and in the high frequency range (several hundred MHz to several GHz) for various functions. In this case, the signal transmission in the low frequency range is of shorter range than in the high frequency range. Thus, it is to be ensured, among other things, that only users having a matching ID transponder in the immediate vicinity of the motor vehicle get access to the motor vehicle.

It is known that access to a motor vehicle can be compromised by so-called relay-station attacks.

For example, US 2006/0255909 A1 discloses a system for preventing such relay-station attacks.

In such an attack, a great distance between an ID transponder (e.g., in the form of a motor vehicle key) and the motor vehicle is bridged, even though access control at this distance should not actually be successfully transacted.

For example, two people approach, each equipped with radio-extension stations, to the active components of the access system. In this case, one person approaches the motor vehicle, whereas the other person approaches the ID transponder. Both persons carry electronic radio-extension stations that are in high frequency communication with each other.

In addition, these extension stations are able to receive both low frequency- and high frequency signals from the motor vehicle or from the ID transponder. These signals are to be transmitted in a high frequency message to the other station and to be output from there again as low frequency or high frequency signals.

As described in the aforementioned document, this leads to, for example, allowing access to a motor vehicle, even though a user with a legitimate ID transponder is far away from the associated motor vehicle.

The entire low frequency (LF) information flow, and also the subsequent high frequency communication between the ID transponder and a motor vehicle is extended via the two extension stations as relay stations.

Document WO 2015/084852 discloses a system and a method, which is to prevent the extension by such relay attacks. This system works by analyzing the field vectors of the signal fields and the angles between the field vectors, in which the associated fields are generated by multiple antennas on a motor vehicle.

The antennas on the motor vehicle are time-delayed or also activated at the same time to be received and analyzed at the position of an ID transponder.

The ID transponder has 3D antennas for this purpose. Such 3D antennas are standard components, which are often used in ID transponders. These 3D antenna modules have multiple antenna coils in different spatial orientations and can detect signal strengths of electromagnetic signals in three different spatial directions.

In said document, different antennas are activated on the motor vehicle, which inevitably have different orientations to the mobile ID transponder.

It is then checked whether the respective signal strengths received in different spatial directions are consistent with the antenna positions on the motor vehicle. In addition, the targeted transmission strengths of the antennas can be varied so as to cause angular shifts of the resulting field vector.

If an extension takes place via one or more relay stations, the maintenance of this information for the orientation of the electromagnetic field is hardly possible. Even if the information were detected in the first, near-vehicle relay station, the position of the relay stations to one another is not to be predetermined, and also, not the position of the ID transponder to the ID transponder-side relay station.

The key will be determined according to the inconsistency between the known positions of the antennas on the motor vehicle and the received signals, and can deduce a relay attack.

Depending on the position of an ID transponder to the motor vehicle, the signal strength can be changed significantly. This is the case e.g., where if an ID transponder is in an unfavorable position relative to one of the used transmission antennas, it comes to overrides or low signal strengths, or even if the ID transponder is placed in a point, the field vectors of the simultaneously operated antennas are canceled.

The invention relates to a further development of the system and the method of said WO 2015/084852 A1.

Accordingly, reference is made to this document with respect to the basic principle of the function of the evaluation of the field vectors and orientation-dependent signal strengths.

The object of the invention is to design a method for detecting relay attacks reliably and robustly.

BRIEF SUMMARY

This object is achieved by a method having the features of claim 1.

The invention uses the assembly of multiple, spatially different transmission antennas on the motor vehicle. These antennas send out low frequency signals, which are to be received only in the immediate vicinity of the motor vehicle. Such low frequency (LF) signals are used in keyless access systems in order to wake up an ID transponder, for example, from a sleep mode.

Frequently, vehicle-side LF transmission antennas are arranged in the area of door handles, for example, side doors or the tailgate. However, the LF transmission antennas can also be placed in the interior of the motor vehicle or in the roof area as well in the front window area.

In the motor vehicle, a control device is arranged, which can control the respective LF-transmission antennas for sending out low frequency signals. This control can happen time-delayed or also simultaneously, so that the LF transmission antennas send out their signals with a certain time interval or send out multiple LF-transmission antenna signals simultaneously.

An ID transponder is designed to be mobile relative to the motor vehicle, and has a 3D antenna assembly.

Such a 3D antenna assembly has multiple antenna coils oriented in different spatial directions, which can receive signals. In addition, the ID transponder has a communication device, which is formed for communicating with the vehicle-side control device of a motor vehicle.

Also, the vehicle-side control device is coupled to a transmission-reception means to handle such communication. Such transmission-reception means are usually formed for communication in the high frequency range (HF) and are known and used in conventional keyless access systems.

In a system according to the prior art (see WO 2015/084852 A1), the vehicle-side LF transmission antennas are controlled at different spatial positions in order to send out low frequency signals.

An ID transponder receives the respective signals with its 3D assembly antennas, and can perform a signal strength evaluation in the axis direction of the individual receiving antennas.

According to the invention, it is provided that a mobile ID transponder receives time-delayed signals from each of vehicle-side LF transmission antennas in the first receiving phase. Depending on the position of the ID transponder, these different signal strengths are received by the respective LF-transmission antennas.

According to the invention, the transmission antennas are first controlled time-delayed in such a way that in each case, at the same time, only one antenna is in an active transmission operation.

In addition, a vehicle-side control assembly is so formed that initially the individually operated transmission antennas are subsequently operated simultaneously. While the 3D antenna assembly in an ID transponder sees only the field of a single antenna in the case of the individual active antennas, in the simultaneous sending out of multiple antennas, a superimposed field is received.

Depending on how the signal strengths of antenna fields are superimposed at the position of an ID transponder, a field vector with a certain orientation in the space is resulted.

According to the invention, it is provided that an ID transponder evaluates the signal strengths of the received signals in the different spatial directions of its 3D antenna assembly, and information related to the signal strengths is transmitted back to the motor vehicle. Depending on this information of the space-direction-dependent signal strengths, a vehicle-side control device performs the adjustment of the signal strengths of the LF transmission antennas or selects other LF transmission antennas.

After this adjusted selection, signals are again sent out in order to detect data for detecting an unauthorized extension of the radio-path (relay attack).

The methods used for this mostly correspond to those of the cited prior art (WO 2015/084852).

Again, multiple antennas are then time-delayed and then simultaneously operated (or vice versa), and the signal strengths in the different spatial directions are evaluated in an ID transponder. Thereafter, a plausibility check is performed, since the position of the antennas is known to the motor vehicle, and the expected signal strengths and signal strength changes can be derived from this spatial position.

For example, if a first antenna is operated with a first signal strength and then a second antenna with a second signal strength, the respective signal strengths are received and stored in the ID transponder.

Thereafter, these two antennas are operated, for example, at the same time and with the same signal strengths as before, and the measured space vector of this measured superimposed field distribution must be identical to the calculated direction of a space vector, generated from individual measurements.

If this is not the case, for example, all space vectors are in the same direction, there is almost certainly an unauthorized extension of the radio-path.

An essential aspect of the invention is therefore to make a vehicle-side adjustment of the signal strengths as a function of space-direction-dependent signal strengths, as they have been received in the ID transponder. In this way, situations become manageable, which could be evaluable according to the prior art, only with great uncertainty.

This applies, for example, to situations, in which a user of a motor vehicle with his ID transponder is placed between two antennas so that the space vectors of the fields are canceled in one spatial direction of the 3D coil assembly. By the feedback from the ID transponder related to the received field strength, the signal strength can be adjusted (for example by increasing the transmission power in one of the LF transmission antennas and by lowering the transmission power in another antenna), so that the method according to the prior art can be carried out for the plausibility check.

The returning transmission of the information from an ID transponder to a vehicle-side controlling device may be made, in particular via a high frequency communication. In addition, it may be provided that multiple passes are provided for the case where problems occur again even with an adjusted transmission power-setting.

According to the invention, a plausibility check can take place, in principle, both in the ID transponder and in the motor vehicle.

For example, for this, it may be provided that an ID transponder, after each reception, immediately sends back information related to the received signal strengths in different spatial directions.

Then, an assignment to the transmission antenna is made on the vehicle-side control device, as this has the knowledge about the control of the transmission antennas.

Alternatively, it can also be provided that an ID transponder waits a predetermined time period and then transmits back a sequence of signal strengths for a series of received signals, and then an assignment to the corresponding spatial positions of the transmission antennas is made in the motor vehicle and evaluated.

In a preferred embodiment of the invention, the signals sent out by the vehicle-side transmission antennas contain a unique identifier of the respective transmitting transmission antennas.

Such an identifier can then be evaluated in an ID transponder, and the ID transponder can send back the received signal strengths in an assignment to the antennas on the motor vehicle.

Alternatively, in an ID transponder, the position of the respective transmission antennas can be stored and then plausibility checks for the received signals are performed directly in the ID transponder.

In one embodiment of the invention, an ID transponder receives at least one of the first time-delayed low frequency signals by means of the 3D antenna assembly.

Then, when an override is detected in at least one of the spatial directions of the 3D antenna assemblies, the corresponding signal information is transmitted to the control devices in the motor vehicle.

This information can be, for example, in a received signal strength, in which the vehicle-side overdriving is detected, when the signal strength is above a predetermined threshold. Alternatively, the information can be transmitted from an ID transponder, thus it comes to an override in one of the transmission antennas.

It is essential that the vehicle-side control device is induced, depending on the information, to reduce the transmission power of the associated vehicle-side transmission antenna.

This measurement is particularly advantageous when an ID transponder is located in the immediate vicinity of a transmission antenna, for example, in the trouser pocket of a user in the area of a side handle of a vehicle door.

The reduction of the transmission strength of the associated antenna ensures that an angular dependence in the subsequent signal transmission is carried out for a plausibility check and for the detection of an unauthorized radio path extension with the best possible dynamics.

Otherwise, in an override of one of the spatial directions, the resulting field vector could be indistinguishable from a varied field vector within the measurement accuracy. In this embodiment, the invention contributes to provide an optimized dynamic range for the plausibility check at any time.

In another embodiment of the invention, whenever a signal strength evaluation in the ID transponder indicates that a signal strength in one spatial direction is below a predetermined threshold, the information related to the signal strengths in the control device causes the transmission powers of the associated vehicle-side transmission antenna to be increased.

Also, in this configuration, the dynamics of the signal detection for a plausibility check is improved, since the signal vectors are guided in a range, in which they have the most possible comparable lengths.

In another modification of the invention, based on the information in the vehicle-side control device, it is recognized that one of the antennas in an ID transponder can either not at all be received or be received only with very low signal strength. In this case, a vehicle-side control device selects another one of the multiple antennas on the motor vehicle in order to use this for the method. In any case, it is necessary for the resulting method, that at least two antennas remain at two different spatial positions.

In a further development of the invention, the information regarding the space-direction-dependent signal strengths relates to those signals which have been received during the simultaneous sending out of multiple antennas.

If only a very weak or even vanishing signal is detected in an ID transponder, in such a simultaneous sending out of multiple LF transmission antennas in a spatial direction, the information in the vehicle-side control device leads to the fact that the transmission strengths of the used antennas are changed relative to each other.

For example, one of the transmission strengths of the LF transmission antennas can be increased or another one of the transmission strengths can be reduced. However, one of the transmission strengths can also be increased and in addition, another one can also be reduced.

Therefore, for example, if a user with his ID transponder is located exactly between two active LF transmission antennae, the resulting field in one spatial direction can disappear. According to the invention, this information is transmitted back to the vehicle-side control device, and it performs the adjustment of signal strengths. For example, the transmission strengths of the used LF transmission antennas is increased by 20%, whereas the transmission strength of another antenna is reduced by 20%.

Then, if the method is repeated and send these antennas at the same time, the previously disappeared field vector can be constructed in such a way that in each spatial direction, a signal strength can be detected.

As described above, the method relates to the supplementation of known methods for the detection of a radio-path-extension, which benefit from the change of field vectors of an electromagnetic field.

For this purpose, in principle, any methods according to the prior art, are applicable, which carry out the plausibility check that takes into consideration the position of the antennas on the motor vehicle and checks them for consistency with the received signal strengths.

In one embodiment of the invention, a plausibility check is carried out after the above-described adjustment of the signals, thus with the adjusted signal strengths, two transmission antennas on the motor vehicle are controlled so as to send out signals simultaneously. The ID transponder receives these superimposed signals and generates therefrom field strength information in the spatial dimensions and a resulting field vector.

Subsequently, the two antennas are controlled with mutually changed signal strengths, which leads to a rotation of the field vector of the superposed fields at the position of the ID transponder. It can be checked in the ID transponder or in the motor vehicle itself, whether this field vector rotation corresponds to a rotation, which is consistent with the transmission strengths and spatial positions of the transmission antennas. Such a check can be carried out both in an ID transponder and a motor vehicle itself.

BRIEF DESCRIPTION OF THE DRAWINGS

The invention will now be explained in more detail with reference to the accompanying figures.

FIG. 7 shows a flow diagram of a further embodiment of the invention.

DETAILED DESCRIPTION

Figure 1:
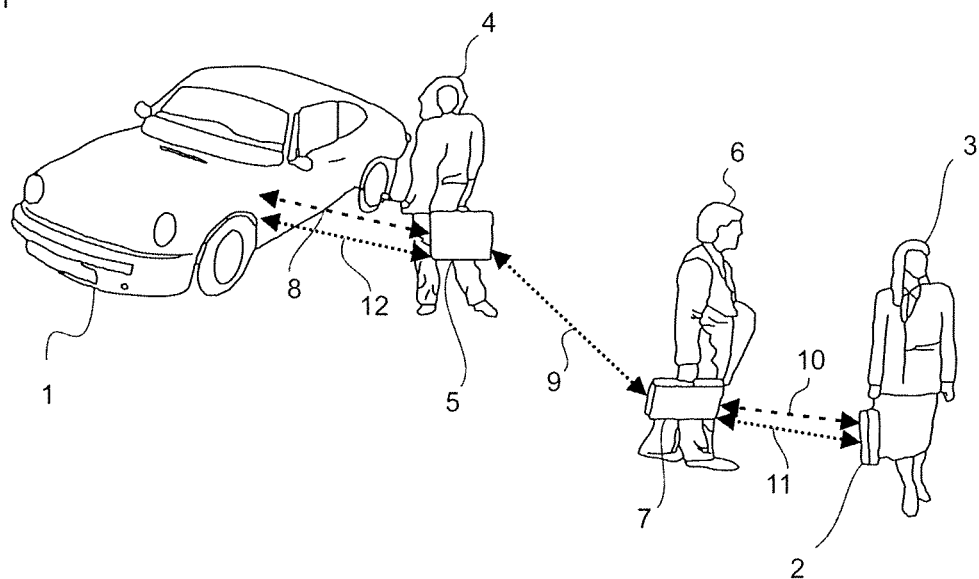
FIG. 1 schematically shows the flow of unauthorized radio-path-extension, a so-called relay station attack.

In FIG. 1, the basic flow of a relay-attack (radio-path-extension) between motor vehicle 1 and authorized ID transponder 2 is shown.

Person 3 carries authorized ID transponder 2 for motor vehicle 1 with him.

However, person 3 with ID transponder 2 is located outside the reach of the low frequency signals that motor vehicle 1 with associated LF transmission antennas can send out for the start of communication with the ID transponder.

In this context, the term "low frequency signals" should cover "frequencies in the range of 3-300 KHz".

The term "high frequency signals" refers to frequencies in the range of 300 MHz-3 GHz.

In this example, low frequency signals about 125 KHz was used, whereas the high frequency signals are in the range of 300 MHz.

Person 4 with device 5 is located in the vicinity of motor vehicle 1 for a radio-path-extension.

Another person 6 with another station 7 is located for a radio-path-extension in the vicinity of person 3 with ID transponder 2. Motor vehicle 1 sends out low frequency signals 8, which are received by device 5.

This transmits the information from low frequency signals 8 in high frequency communication 9 to another extension station 7. This, in turn, sends out low frequency signals in message 10. Signals 10 are received by ID transponder 2 and erroneously interpreted there as the signals of a motor vehicle located in the vicinity.

ID transponder 2 responds with a high frequency message 11, which contains authentication information.

These are transmitted back via high frequency connection 9 from station 7 to station 5 and sent from there in a signal response 12 to the motor vehicle. Motor vehicle 1 assumes that an ID transponder in the vicinity has reported to the motor vehicle with the information, checks the authentication information, and unlocks the motor vehicle.

In this method, it is not possible to easily detect such a radio-path-extension.

The already above-cited WO 2015/084852 A1 describes a method, which enables the detection of radio-path-extensions. In this case, position-different antennas are operated successively and/or together, and the resulting field vectors are evaluated at the position of the ID transponder.

Figure 2:
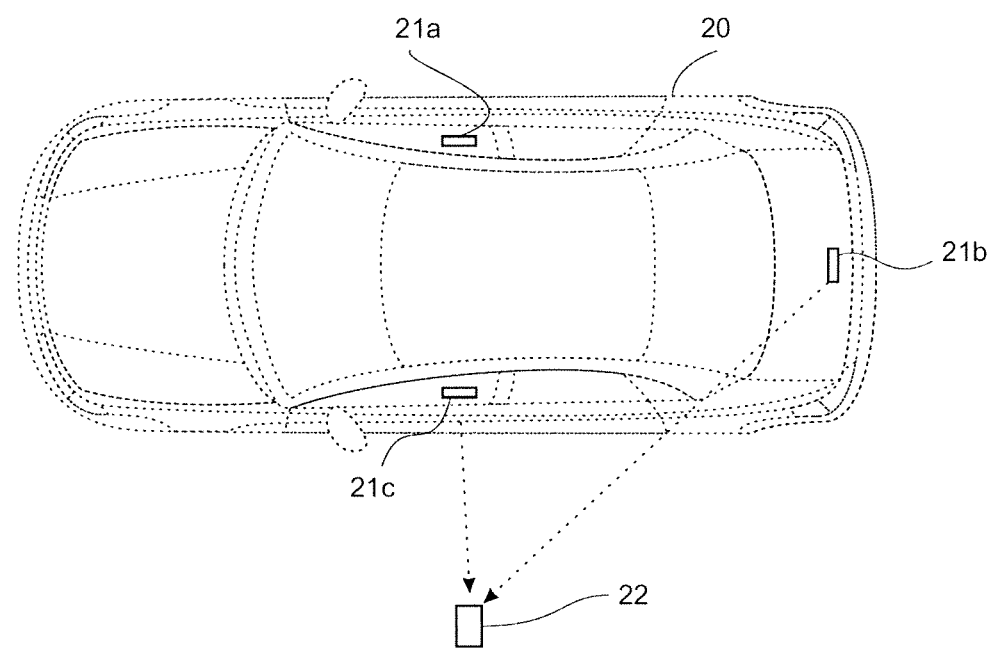
FIG. 2 schematically shows the assembly of multiple LF transmission antennas on the motor vehicle and their positions relative to a mobile ID transponder.

FIG. 2 shows, for clarity, the assembly of antennas on motor vehicle 20 with 3 antennas 21a, 21b and 21c.

ID transponder 22 for a keyless access system of the motor vehicle is located in the vicinity of the motor vehicle. Transmission antennas 21a, 21b and 21c are transmission antennas for low frequency signals.

In the illustration of FIG. 2, it can be seen that antenna 21b occupies another spatial orientation to ID transponder 22 than antenna 21c. Accordingly, signals from these antennas with different field vectors are received in ID transponder 22. In addition, the received signal strengths are strongly dependent on the distance and the shielding of each of the antennas relative to the ID transponder.

Figure 3:
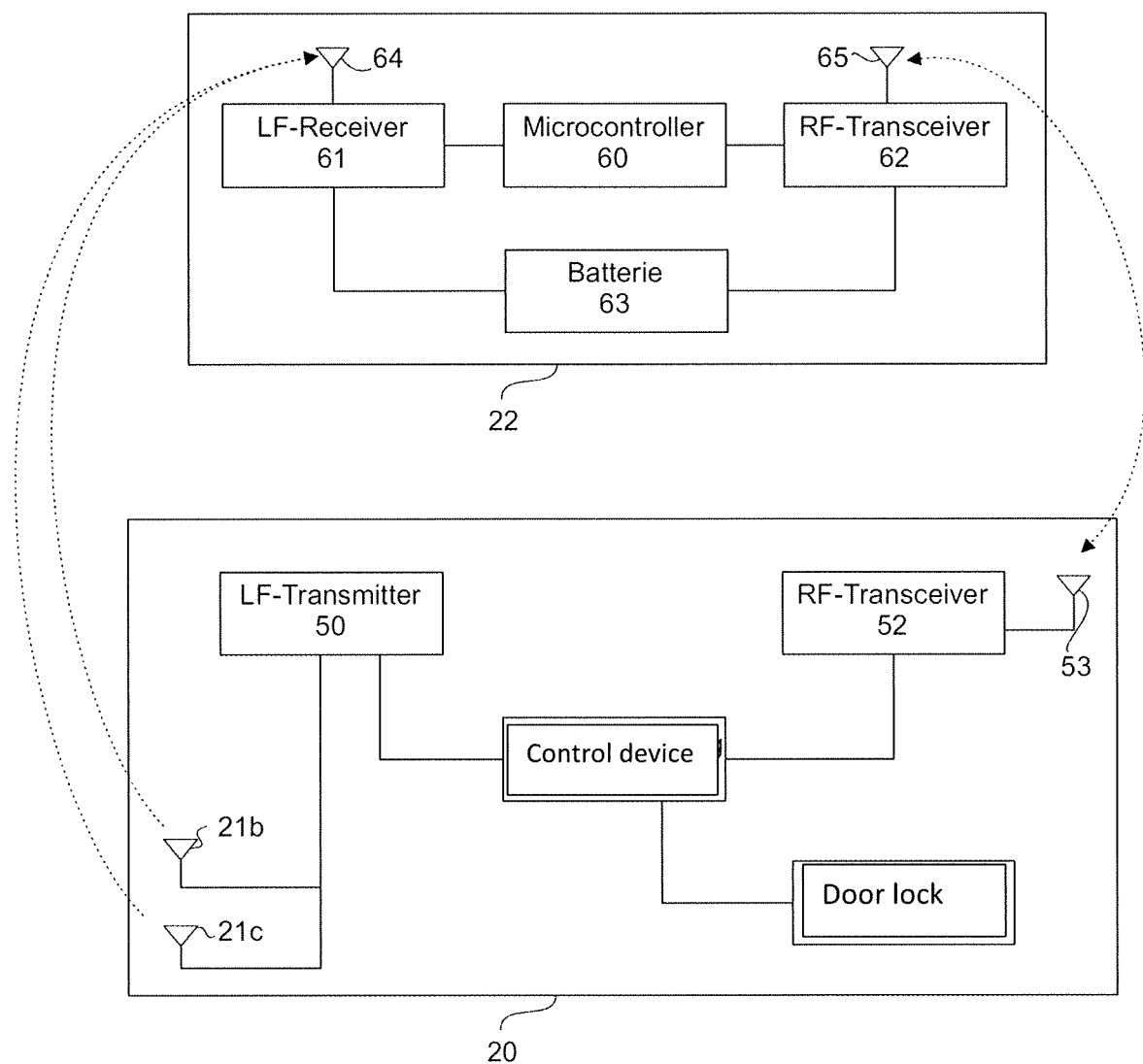
FIG. 3 shows the relevant components of a system for the embodiment of the invention.

FIG. 3 illustrates, in an abstracted manner, the invention-relevant components of motor vehicle 20 and ID transponder 22.

In motor vehicle 20, LF transmitter 50 is arranged, which is coupled to the central control device 51.

To LF-transmitter 50, two antennas 21b and 21c are coupled, which, in this example, occupy the positions at motor vehicle 20 in FIG. 2. Furthermore, the motor vehicle has a high frequency transceiver or high frequency transceiver 52, which is coupled to antennas 53. Control device 51 is coupled to high frequency transceiver 52 so as to control this for communicating with ID transponder 22.

In addition, door lock 54 is coupled to the control device in order to be able to lift the door lock after successful authentication of an ID transponder.

ID transponder 22 has microcontroller 60 as well as low frequency receiver 61. Furthermore, high frequency transceiver 62 is provided. Battery 63 is coupled to this for the supply of all components.

Low frequency receiver 61 and high frequency transceiver 62 are coupled to microcontroller 60.

Microcontroller 60 can evaluate the received signals from LF receiver 61, and control high frequency transceiver 62 for communication with the motor vehicle.

For this purpose, in each case, antennas are coupled to high frequency transceiver 62 and low frequency receiver 61. Antenna 64 receives the low frequency signals of antennas 21b and 21c.

Antenna 65 serves as a transmitting and receiving antenna for communication with the vehicle-side high frequency transceiver 52 and antenna 53, assigned to the high frequency transceiver.

Figure 4:
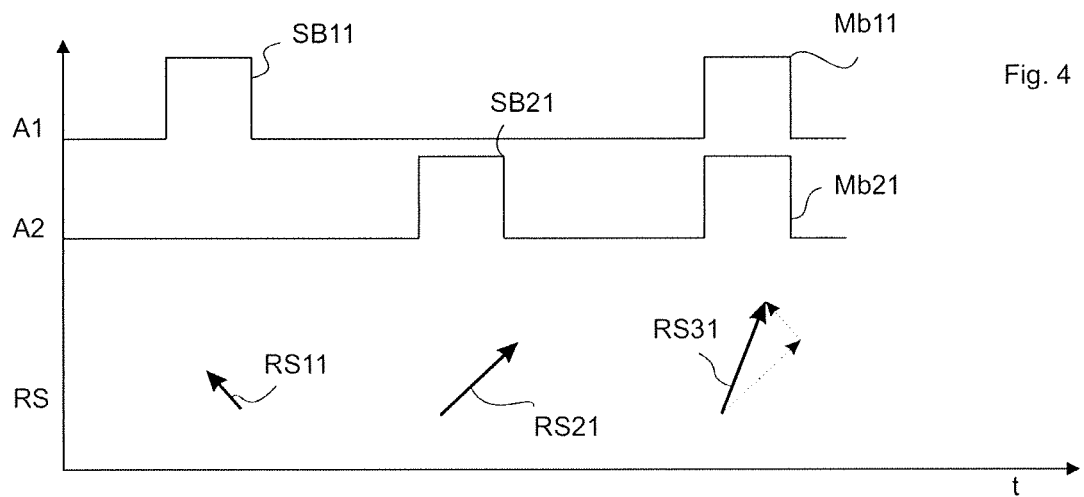
FIG. 4 schematically shows the timing flow of transmission signals and the associated field vectors.

FIG. 4 schematically shows the verification of the plausibility of the received signals in an ID transponder.

Along the time axis, the control level of a first vehicle-side LF transmission antenna A1 and a second vehicle-side LF transmission antenna A2 are shown.

A single burst of antenna A1 is indicated with reference numeral SB1. As a "single burst", in this case, is to be understood a signal transmission of a predetermined duration of a single antenna.

With reference numeral SB2, a single burst of antenna A2 is shown.

Reference numerals MB1 and MB2 denote the respective portions of a synchronous multi-burst of antennas A1 and A2, and thus, the simultaneous sending out of multiple antennas.

Antennas A1 and A2 are thus initially operated with a time-delay. Only after the single-burst of antenna A1 is completed, in this example with a time interval, a single burst of antenna A2 is caused.

The control of these LF transmission antennas takes over the vehicle-side control device.

Subsequently, both antennas are controlled for the synchronous sending out of a so-called multi-burst.

The bottom row of diagram 4 shows, in a schematic way, the received field vectors at the position of the ID transponder. The ID transponder has a 3D antenna assembly, which, along three spatial axes, receives low frequency signals. For each of the three spatial axes and thus to each of the antenna coils, an associated signal strength is determined. With these signal strengths in the three spatial axes, it results in a three-dimensional vector of a field strength distribution or a signal strength distribution.

In the examples of this invention, the three-dimensional vectors are presented in two-dimensions, however the addition of another spatial direction is readily apparent. In FIG. 4, it is shown that both antenna A1 and antenna A2 are controlled for sending out the same signal strengths.

In this example, this applies to both the single-bursts and to the synchronous multi-burst.

On the contrary, the signal strengths received by an ID transponder are by no means the same.

This is due to the distance and orientation of the ID transponder relative to the position-different antennas on the motor vehicle. The received signals (received signals) are shown in the row RS.

When sending out single burst SB11, the 3D coil assembly receives a signal strength distribution along the spatial axes, which corresponds to vector RS11. Vector RS21 corresponds to the signal strength in the single burst SB21.

From these signal strengths, in principle, a resultant vector can be calculated by addition.

During the subsequent multi-burst, signal strength vector RS31 is measured. This actually measured signal strength vector RS31 is compared with the sum of vectors RS11 and RS21 in the ID transponder.

If a match is found within predetermined tolerance limits, the authentication method is continued with the motor vehicle. If no match is found, the existence of an unauthorized radio-path-extension is closed.

FIG. 4 shows an example of such a plausibility check, there are other possibilities of a plausibility check based on the space orientation of the received signal strengths and they are described, for example, in the aforementioned document WO 2015/084852.

Figure 5A:
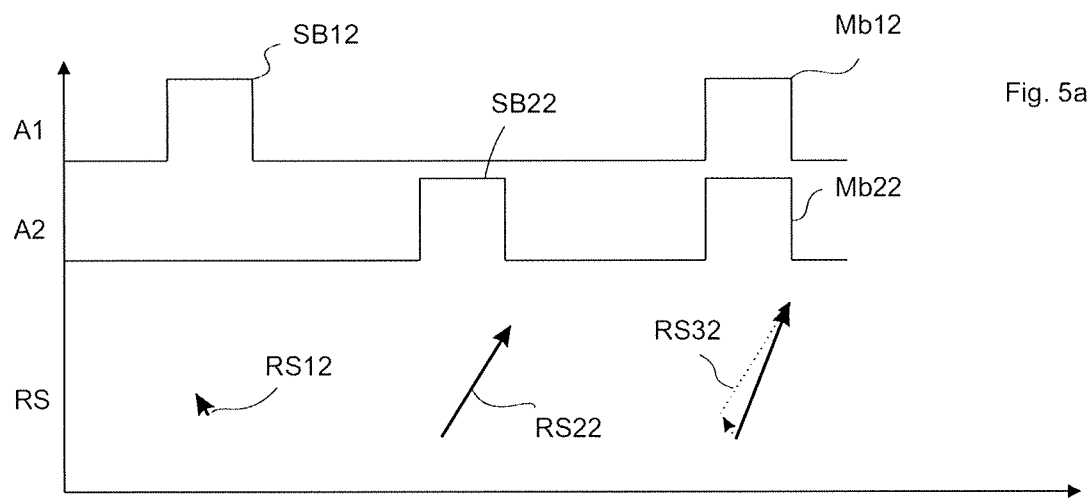
FIGS. 5a and 5b show an example of the adjustment of transmission signal strengths according to an embodiment of the invention.

In this method, however, problems may occur, for example, which are shown in FIG. 5a.

The signal strength sequence of FIG. 5a corresponds to that of FIG. 4. However, in this case, the ID transponder is positioned at a different position and with a different shielding. By the signal strength of the first single burst SBS 12, only a small signal strength vector RS12 is detected in the ID transponder.

On the contrary, a considerably large signal strength vector RS22 is detected by burst signal RS22. The addition of these vectors RS12 and RS22 leads to a vector, due to the significantly different, received signal strengths, which is almost equal to the strength of the vectors, namely RS22, within the measured value tolerance. Thus, if signal strength vector RS32 is detected during multi-burst MB12 and MB22, no reliable check of the deviation of the signal strength vectors is possible, due to the low signal strength RS12 within the measurement tolerances.

According to the invention, therefore it is provided that in the case where a signal, which is received in the ID transponder, overrides the field strength measurement or the field strength measurement is below a predetermined minimum value, an adjustment of the field strengths takes place on the motor vehicle side.

This is realized by transmitting information about the field strength measurement by the ID transponder to the motor vehicle, and by adjusting the transmission strengths of the antennas by the control device, depending on this information, in order to allow a reliable evaluation in order to check for a relay attack.

In the example of FIG. 5a, the ID transponder, after receiving all signals or already after receiving the burst SB12, sends information via high frequency radio communication to the vehicle-side control device.

Figure 5B:
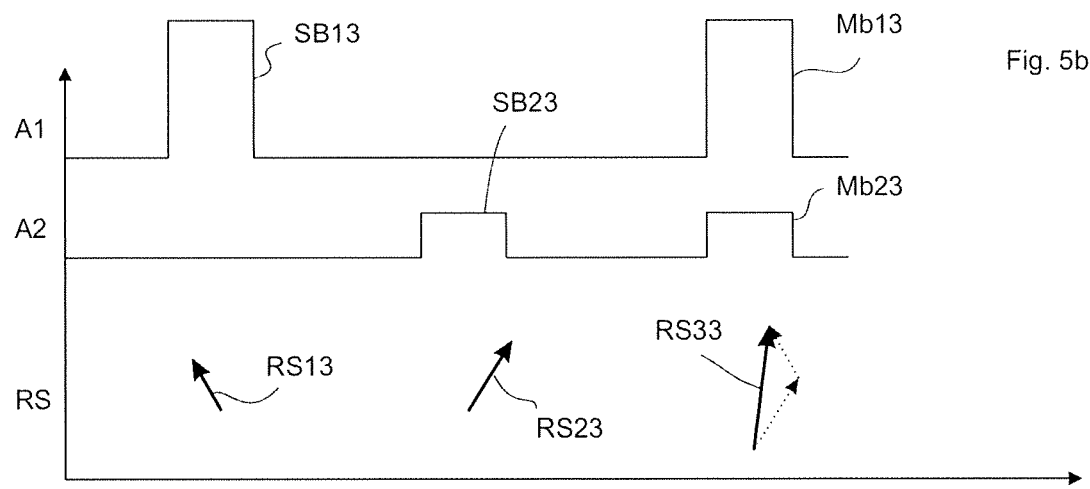

The vehicle-side control device checks the information and adjusts the transmission strengths of antennas A1 and A2, as shown in FIG. 5b. Antenna A1 is thus operated with increased transmission power, whereas antenna A2 is operated with reduced signal strength. This can be recognized by single-bursts SB13 and SB23 as well as the associated components of multi-burst MB13 and MB23.

Now, the signal strength vectors RS13 and RS23 result from the received signal levels of the 3D coil assembly in the ID transponder as well as, during the multi-burst, field strength vector RS33, which enable a reliable evaluation in the measurement tolerances.

The invention leads to the performance of an optimized evaluation of the space vectors by the feedback of the signal strengths from the ID transponder to the motor vehicle and by the local adjustment of the transmission signal strengths. This applies, in principle, to all methods, in which the spatial orientation of the vectors is used to check for a relay attack.

Figure 6A:
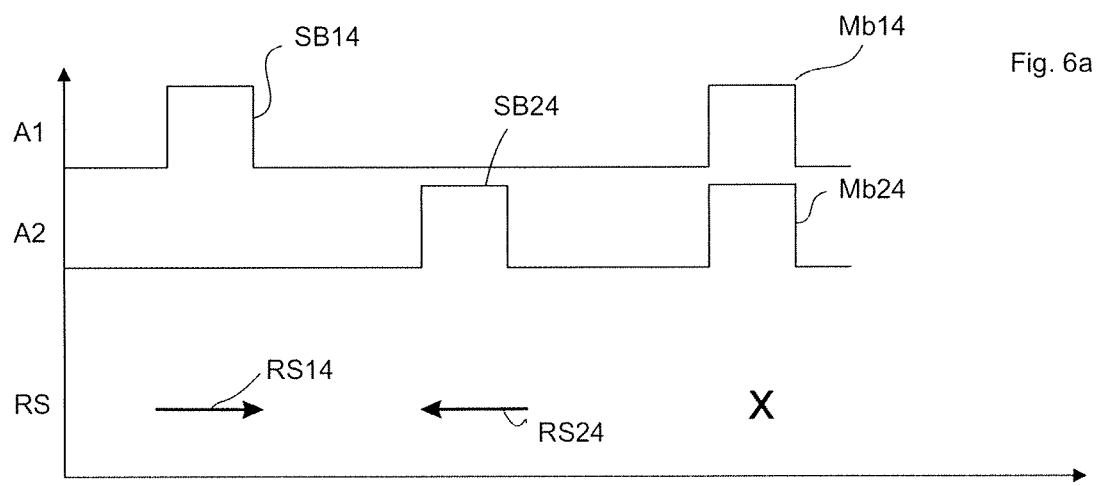
FIGS. 6a and 6b show an example of the change of the signal strengths according to a second embodiment of the invention.
Figure 6B:
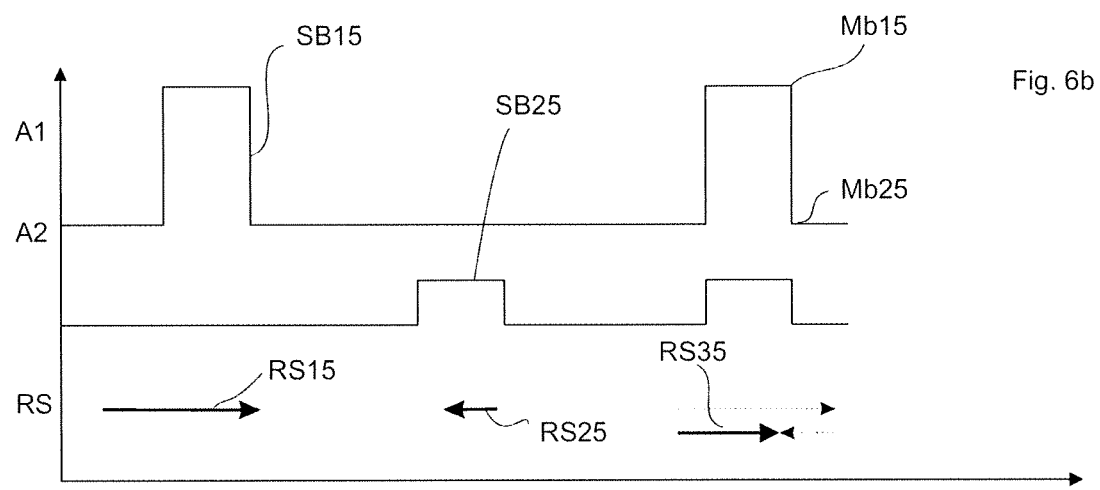

The FIGS. 6a and 6b show other situations of the use of the invention. Again, antennas A1 and A2 are initially in a single-burst operation and then controlled in a multi-burst operation.

In this case, single bursts SB14 and SB24 result in signal strength vectors RS14 and RS15, which however, cancel each other. In this case, no reliable evaluation of a vector sum is possible, for example, because the user with his motor vehicle is located in an unfavorable position between two transmission antennas.

By the feedback of the received field strengths from an ID transponder to a motor vehicle, it is possible that the transmission strength of antenna A1 is increased whereas at the same time, the transmission strength of antenna A2 is reduced. This results in single bursts SB15 and SB25 in FIG. 6b and the associated, received signal strength vectors RS15 and RS25.

These vectors do not cancel each other any longer so that a plausibility comparison of signal RS35, received during multi-bursts MB15 and MB25, can be performed with the calculated sum of signals RS15 and RS25.

Such usability of the field evaluation in the area of zero-position is made possible only by the feedback from an ID transponder to a motor vehicle.

At what time point this feedback will take place is arbitrary. In principle, it can also take place, for example, after each single burst and/or any multi-burst. The communication related to this signal strengths between an ID transponder and a motor vehicle takes place via high frequency communication.

FIG. 7 shows, as an example, a method flow of another embodiment of the invention.

In step 100, the control device sends out a low frequency burst signal with a first vehicle transmission antenna A1. In step 110, the low frequency burst signal of transmission antenna A1 is received with the 3D antenna assembly in the ID transponder. Subsequently in step 120, a burst signal is sent with other, position-shifted vehicle transmission antenna A2, and in step 130 is received in the ID transponder.

After receiving the two burst signals, the ID transponder sends the RSSI information related to the spatial axes, that is, information about the signal strength vector at the position of the ID transponder, to the motor vehicle control unit via a high frequency communication connection.

If on the motor vehicle-side, in step 150, it is found that a signal strength vector, such as transmitted by the ID transponder, indicates an override or understeer of one of the antennas of the 3D antenna assembly, it is branched to step 125 in order to perform an adjustment of the transmission strengths of antenna A1 and/or A2.

With an ID transponder, too weak, received signals lead to an increase in the transmission strength of the associated antenna. Under the override of the received signals at the position of the ID transponder, in the associated antenna, its transmission strength is reduced. It can also be provided at this point, that in a strong override or understeer, an antenna other than A1 or A2 is switched on in order to perform the method with spatially favorably located LF transmission antennas on the motor vehicle.

If there is neither override nor understeer, the motor vehicle control device controls, at 160, antennas A1 and A2 for the synchronous sending out of a multi-burst. The associated signals are, at step 170, received by the 3D antenna assembly in the ID transponder.

In step 180, it is checked whether an override of the received signal strengths is present during the multi-burst. If this is the case, it is, in turn, branched to step 125 and the method with adjusted signal strengths is restarted.

If there is no override or understeer, it is checked whether zero-position is present, i.e., whether the signal strengths cancel each other at the position of an ID transponder.

If this is detected, also in step 125, an adjustment of the signal strengths is made (e.g., by increasing the transmission strengths of one of the participating LF transmission antennas and by reducing the transmission strengths of another one of the LF transmission antennas).

In step 200, the method has been conducted, in which all received signal strengths have been in allowable dynamic ranges. There, the evaluation regarding the consistency of signal strengths can be carried out according to the example above. In particular, at this point, the sum of the received signal strength-vectors of single bursts can be compared with the received signal strength-vector of multi-bursts.

If these signals are plausible, in 205, the authentication dialog between the ID transponder and the motor vehicle can be carried out, since according to this evaluation, no relay attack is present. If this information is not plausible, a relay attack is detected, and the authentication dialog is aborted in step 210.

The invention claimed is:

1. A method for operating a passive access system for motor vehicles,
   wherein on an associated motor vehicle, multiple vehicle-side transmission antennas are arranged on different spatial positions for sending out low frequency signals, which are coupled to at least one control device,
   wherein the control device is coupled to vehicle-side transmission-reception means for wireless communication,
   wherein a mobile ID transponder with respect to the associated motor vehicle is formed by a 3D-receiving antenna assembly for receiving low frequency signals,
   wherein the ID transponder has key-side transmission-reception means for a wireless communication,
   wherein by means of the control device, a first vehicle-side transmission antenna and a second vehicle-side transmission antenna are controlled for time-delayed sending out first time-delayed low frequency signals with respectively arranged transmission signal strengths,
   wherein by means of the control device, the first- and the second vehicle-side transmission antenna are controlled for simultaneously sending out the first simultaneous low frequency signals with respectively arranged transmission signal strengths,
   wherein in the mobile ID transponder, at least one of the time-delayed or simultaneous low frequency signals is received by means of 3D antenna assembly, and for each of the spatial directions, a signal strength evaluation is carried out, so that for each of the spatial directions of the 3D receiving antenna assembly, space-direction-dependent signal strength information is determined,
   wherein information related to the space-direction-dependent signal strengths of the ID transponder is transmitted wirelessly from the key-side transmission-reception means to the vehicle-side transmission-reception means of the control device,
   wherein the control device receives information related to the space-direction-dependent signal strengths and, depending on the received information, controls one or more vehicle-side transmission antennas for sending out time-delayed or simultaneously other low frequency signals,
   wherein the respectively assigned transmission-signal strengths are selected depending on the received information related to the space-direction-dependent signal strengths,
   wherein in the mobile ID transponder, further low frequency signals are received by means of the 3D antenna assembly, and for each of the spatial directions, a signal strength evaluation is performed, so that for each of the spatial direction of the 3D antenna assembly, further space-direction-dependent signal strength information is determined,
   wherein depending on further spatial direction-dependent signal strength information, a plausibility check is carried out, which checks whether the space-direction-dependent signal strength information is consistent, in order to detect an extension of the signal path between the associated motor vehicle and the ID transponder via intermediate stations,
   wherein in the mobile ID transponder, at least one of the first time-delayed low frequency signals is received by means of the 3D antenna assembly, and
   wherein then, when the signal strength evaluation indicates a signal strength below a predetermined threshold in at least one of the spatial directions of the 3D antenna assembly, the information related to the space-direction-dependent signal strengths in the control device causes another vehicle-side transmission antenna, instead of the vehicle-side transmission antenna associated with the signal, to be controlled for sending another signal.

2. The method according to claim 1, wherein in the signals sent from the vehicle-side transmission antenna, a unique identifier of the respective transmitting transmission antennas is coded.

3. The method according to claim 1,
   wherein in the mobile ID transponder, at least one of the first time-delayed low frequency signals is received by means of the 3D antenna assembly, and
   wherein, then when the signal strength evaluation indicates an override in at least one of the spatial directions of the 3D antenna assembly, the information related to the spatial direction-dependent signal strengths in the control device causes the transmission power of the associated vehicle-side transmission antenna to be reduced.

4. The method according to claim 1,
   wherein in the mobile ID transponder, at least one of the first time-delayed low frequency signals is received by means of the 3D antenna assembly, and
   wherein then, when the signal strength evaluation indicates a signal strength below a predetermined threshold in at least one of the spatial directions of the 3D antenna assembly, the information related to the space-direction-dependent signal strengths in the control device causes the transmission power of the associated vehicle-side transmission antenna to be increased.

5. The method according to claim 1,
   wherein in the mobile ID transponder, at least one of the first simultaneous low frequency signals is received by means of the 3D antenna assembly, and
   wherein then, when the signal strength evaluation indicates a signal strength below a predetermined threshold in at least one of the spatial directions of the 3D antenna assembly, the information related to the space-direction-dependent signal strengths in the control device causes the transmission power of at least one of the associated vehicle-side transmission antennas to be increased or reduced.

6. The method according to claim 5, wherein then when the signal strength evaluation indicates a signal strength below a predetermined threshold in at least one of the spatial directions of the 3D antenna assembly, the information related to the space-direction-dependent signal strengths in the control device causes the transmission power of at least one of the associated vehicle-side transmission antennas to be increased and the transmission power of another one of the associated vehicle-side transmission antennas to be reduced.

7. The method according to claim 1,
wherein the vehicle-side transmission antennas for sending out further low frequency signals are controlled in such a way that at least two vehicle-side transmission antennas are simultaneously controlled,
wherein time-dependently, the transmission antennas are controlled with mutually changed signal strengths, in such a way that in the ID transponder, the superimposed-received signals have time-dependently different field vectors, wherein depending on a time-dependent change of the field vectors, a plausibility check is performed.

8. A method for operating a passive access system for motor vehicles,
wherein on an associated motor vehicle, multiple vehicle-side transmission antennas are arranged on different spatial positions for sending out low frequency signals, which are coupled to at least one control device,
wherein the control device is coupled to vehicle-side transmission-reception means for wireless communication,
wherein a mobile ID transponder with respect to the associated motor vehicle is formed by a 3D-receiving antenna assembly for receiving low frequency signals,
wherein the ID transponder has key-side transmission-reception means for a wireless communication,
wherein by means of the control device, a first vehicle-side transmission antenna and a second vehicle-side transmission antenna are controlled for time-delayed sending out first time-delayed low frequency signals with respectively arranged transmission signal strengths,
wherein by means of the control device, the first- and the second vehicle-side transmission antenna are controlled for simultaneously sending out the first simultaneous low frequency signals with respectively arranged transmission signal strengths,
wherein in the mobile ID transponder, at least one of the time-delayed or simultaneous low frequency signals is received by means of 3D antenna assembly, and for each of the spatial directions, a signal strength evaluation is carried out, so that for each of the spatial directions of the 3D receiving antenna assembly, space-direction-dependent signal strength information is determined,
wherein information related to the space-direction-dependent signal strengths of the ID transponder is transmitted wirelessly from the key-side transmission-reception means to the vehicle-side transmission-reception means of the control device,
wherein the control device receives information related to the space-direction-dependent signal strengths and, depending on the received information, controls one or more vehicle-side transmission antennas for sending out time-delayed or simultaneously other low frequency signals,
wherein the respectively assigned transmission-signal strengths are selected depending on the received information related to the space-direction-dependent signal strengths,
wherein in the mobile ID transponder, further low frequency signals are received by means of the 3D antenna assembly, and for each of the spatial directions, a signal strength evaluation is performed, so that for each of the spatial direction of the 3D antenna assembly, further space-direction-dependent signal strength information is determined,
wherein depending on further spatial direction-dependent signal strength information, a plausibility check is carried out, which checks whether the space-direction-dependent signal strength information is consistent, in order to detect an extension of the signal path between the associated motor vehicle and the ID transponder via intermediate stations,
wherein in the mobile ID transponder, only one of the first time-delayed low frequency signals is received by means of the 3D antenna assembly, and
wherein the information related to the space-direction-dependent signal strengths in the control device causes another vehicle-side transmission antenna, instead of the vehicle-side transmission antenna, which has not sent the signal received in the ID transponder, to be controlled for sending another signal.

9. The method according to claim 8, wherein in the signals sent from the vehicle-side transmission antenna, a unique identifier of the respective transmitting transmission antennas is coded.

10. The method according to claim 8,
wherein in the mobile ID transponder, at least one of the first time-delayed low frequency signals is received by means of the 3D antenna assembly, and
wherein, then when the signal strength evaluation indicates an override in at least one of the spatial directions of the 3D antenna assembly, the information related to the spatial direction-dependent signal strengths in the control device causes the transmission power of the associated vehicle-side transmission antenna to be reduced.

11. The method according to claim 8,
wherein in the mobile ID transponder, at least one of the first time-delayed low frequency signals is received by means of the 3D antenna assembly, and
wherein then, when the signal strength evaluation indicates a signal strength below a predetermined threshold in at least one of the spatial directions of the 3D antenna assembly, the information related to the space-direction-dependent signal strengths in the control device causes the transmission power of the associated vehicle-side transmission antenna to be increased.

12. The method according to claim 8,
wherein in the mobile ID transponder, at least one of the first simultaneous low frequency signals is received by means of the 3D antenna assembly, and
wherein then, when the signal strength evaluation indicates a signal strength below a predetermined threshold in at least one of the spatial directions of the 3D antenna assembly, the information related to the space-direction-dependent signal strengths in the control device causes the transmission power of at least one of the associated vehicle-side transmission antennas to be increased or reduced.

13. The method according to claim 12, wherein then when the signal strength evaluation indicates a signal strength below a predetermined threshold in at least one of the spatial directions of the 3D antenna assembly, the information related to the space-direction-dependent signal strengths in the control device causes the transmission power of at least one of the associated vehicle-side transmission antennas to be increased and the transmission power of another one of the associated vehicle-side transmission antennas to be reduced.

14. The method according to claim 8,
wherein the vehicle-side transmission antennas for sending out further low frequency signals are controlled in such a way that at least two vehicle-side transmission antennas are simultaneously controlled,
wherein time-dependently, the transmission antennas are controlled with mutually changed signal strengths, in such a way that in the ID transponder, the superimposed-received signals have time-dependently different field vectors, wherein depending on a time-dependent change of the field vectors, a plausibility check is performed.

15. A method for operating a passive access system for motor vehicles,
wherein on an associated motor vehicle, multiple vehicle-side transmission antennas are arranged on different spatial positions for sending out low frequency signals, which are coupled to at least one control device,
wherein the control device is coupled to vehicle-side transmission-reception means for wireless communication,
wherein a mobile ID transponder with respect to the associated motor vehicle is formed by a 3D-receiving antenna assembly for receiving low frequency signals,
wherein the ID transponder has key-side transmission-reception means for a wireless communication,
wherein by means of the control device, a first vehicle-side transmission antenna and a second vehicle-side transmission antenna are controlled for time-delayed sending out first time-delayed low frequency signals with respectively arranged transmission signal strengths,
wherein by means of the control device, the first- and the second vehicle-side transmission antenna are controlled for simultaneously sending out the first simultaneous low frequency signals with respectively arranged transmission signal strengths,
wherein in the mobile ID transponder, at least one of the time-delayed or simultaneous low frequency signals is received by means of 3D antenna assembly, and for each of the spatial directions, a signal strength evaluation is carried out, so that for each of the spatial directions of the 3D receiving antenna assembly, space-direction-dependent signal strength information is determined,
wherein information related to the space-direction-dependent signal strengths of the ID transponder is transmitted wirelessly from the key-side transmission-reception means to the vehicle-side transmission-reception means of the control device,
wherein the control device receives information related to the space-direction-dependent signal strengths and, depending on the received information, controls one or more vehicle-side transmission antennas for sending out time-delayed or simultaneously other low frequency signals,
wherein the respectively assigned transmission-signal strengths are selected depending on the received information related to the space-direction-dependent signal strengths,
wherein in the mobile ID transponder, further low frequency signals are received by means of the 3D antenna assembly, and for each of the spatial directions, a signal strength evaluation is performed, so that for each of the spatial direction of the 3D antenna assembly, further space-direction-dependent signal strength information is determined,
wherein depending on further spatial direction-dependent signal strength information, a plausibility check is carried out, which checks whether the space-direction-dependent signal strength information is consistent, in order to detect an extension of the signal path between the associated motor vehicle and the ID transponder via intermediate stations,
wherein in the mobile ID transponder, at least one of the first simultaneous low frequency signals is received by means of the 3D antenna assembly, and
wherein then, when the signal strength evaluation indicates a signal strength below a predetermined threshold in at least one of the spatial directions of the 3D antenna assembly, the information related to the space-direction-dependent signal strengths in the control device causes another vehicle-side transmission antenna, instead of one of the associated vehicle-side transmission antennas, to be controlled for sending another signal.

16. The method according to claim 15, wherein in the signals sent from the vehicle-side transmission antenna, a unique identifier of the respective transmitting transmission antennas is coded.

17. The method according to claim 15,
wherein in the mobile ID transponder, at least one of the first time-delayed low frequency signals is received by means of the 3D antenna assembly, and
wherein, then when the signal strength evaluation indicates an override in at least one of the spatial directions of the 3D antenna assembly, the information related to the spatial direction-dependent signal strengths in the control device causes the transmission power of the associated vehicle-side transmission antenna to be reduced.

18. The method according to claim 15,
wherein in the mobile ID transponder, at least one of the first time-delayed low frequency signals is received by means of the 3D antenna assembly, and
wherein then, when the signal strength evaluation indicates a signal strength below a predetermined threshold in at least one of the spatial directions of the 3D antenna assembly, the information related to the space-direction-dependent signal strengths in the control device causes the transmission power of the associated vehicle-side transmission antenna to be increased.

19. The method according to claim 15,
wherein in the mobile ID transponder, at least one of the first simultaneous low frequency signals is received by means of the 3D antenna assembly, and
wherein then, when the signal strength evaluation indicates a signal strength below a predetermined threshold in at least one of the spatial directions of the 3D antenna assembly, the information related to the space-direction-dependent signal strengths in the control device causes the transmission power of at least one of the associated vehicle-side transmission antennas to be increased or reduced.

20. The method according to claim 19, wherein then when the signal strength evaluation indicates a signal strength below a predetermined threshold in at least one of the spatial directions of the 3D antenna assembly, the information related to the space-direction-dependent signal strengths in the control device causes the transmission power of at least one of the associated vehicle-side transmission antennas to be increased and the transmission power of another one of the associated vehicle-side transmission antennas to be reduced.

21. The method according to claim 15,
wherein the vehicle-side transmission antennas for sending out further low frequency signals are controlled in such a way that at least two vehicle-side transmission antennas are simultaneously controlled,
wherein time-dependently, the transmission antennas are controlled with mutually changed signal strengths, in such a way that in the ID transponder, the superimposed-received signals have time-dependently different field vectors, wherein depending on a time-dependent change of the field vectors, a plausibility check is performed.

* * * * *